(No Model.)

O. McCARTHY.
COFFIN HANDLE.

No. 433,692. Patented Aug. 5, 1890.

UNITED STATES PATENT OFFICE.

OLIVER McCARTHY, OF MERIDEN, CONNECTICUT, ASSIGNOR TO THE MERIDEN BRITANNIA COMPANY, OF SAME PLACE.

COFFIN-HANDLE.

SPECIFICATION forming part of Letters Patent No. 433,692, dated August 5, 1890.

Application filed January 20, 1890. Serial No. 337,442. (No model.)

*To all whom it may concern:*

Be it known that I, OLIVER MCCARTHY, of Meriden, in the county of New Haven and State of Connecticut, have invented a new Coffin-Handle; and I do hereby declare the following, when taken in connection with accompanying drawings and the letters of reference marked thereon, to be a full, clear, and exact description of the same, and which said drawings constitute part of this specification, and represent, in—

Figure 1:
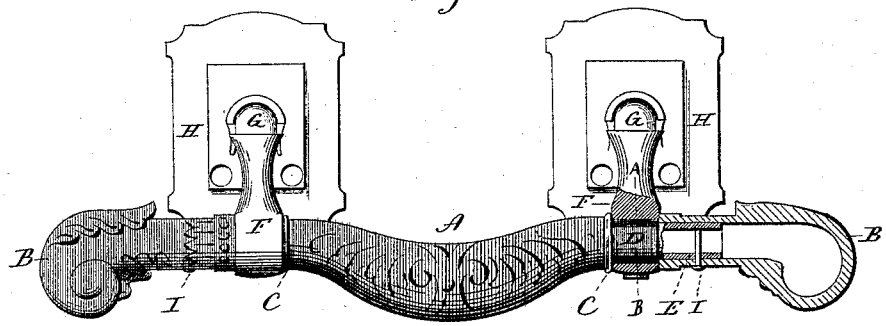
Figure 2:
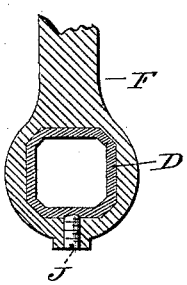

Figure 1, a view in elevation of a coffin-handle embodying my invention, one end of the handle being broken away to show the composite construction of the bail; Fig. 2, an enlarged broken view, in vertical section, on the line A B of Fig. 1.

My invention relates to an improvement in coffin-handles, the object being to produce at a low cost of manufacture a novel and ornamental and strong article.

With these ends in view my invention consists in a coffin-handle having certain details of construction and combinations of parts, as will be hereinafter described, and pointed out in the claim.

As herein shown, the bail is composed of a curved central portion A, two ornamental ends B B, each end of the curved portion A being provided with a bead C, a squared head D, and a cylindrical sleeve E, and the open inner end of each of the ornamental ends B of the bail being adapted to fit over the said cylindrical sleeve E, before mentioned as being located at the ends of the curved portion of the bail. The said squared heads D are respectively inserted into the outer ends of the arms F F, which are provided with corresponding squared openings to prevent the said portion of the bail from turning in them, the opposite ends of the arms forming a knuckle-joint connection G with the socket-plates H H, which are of ordinary construction.

In assembling the parts of my improved coffin-handle the squared heads of the curved portion of the bail are inserted into the outer ends of the swinging arms, after which the ornamental ends of the bail are sleeved over the sleeves of the central portion of the bail and secured thereto in any approved manner, and, as herein shown, by pins I I. Screws J, located in the outer ends of the said arms, impinge against the squared heads of the central portion of the bail and rigidly secure the same to the arms.

Under my improvement I am enabled to employ a hollow ornamental bail having its central portion curved in place of the straight rods heretofore used in connection with coffin-handles having swinging arms attached by a knuckle-joint connection to the socket-plates. The coffin-handle thus produced is highly ornamental, strong, easy to make and assemble, and comparatively inexpensive.

I would have it understood that I do not limit myself to the exact construction herein shown and described for uniting the sections of the bail together, but hold myself at liberty to make such changes and alterations in such form as fairly fall within the spirit and scope of my invention.

It will be understood that I do not claim, broadly, a coffin-handle consisting of a bail hung in arms hinged to the socket-plates with tips attached to the ends of the bail outside the arms, as such, I am aware is not new; but What I do claim is—

In a coffin-handle, the combination, with two socket-plates, of two arms, respectively secured to the said plates by a knuckle-joint connection, and a composite bail having a curved central portion, the ends whereof are provided with squared heads adapted to enter corresponding openings formed in the outer ends of the arms, and with sleeves extending beyond the said squared heads and adapted to have the ornamental heads of the bail sleeved over and secured to them, substantially as described.

OLIVER McCARTHY.

Witnesses:
J. M. HARMON,
C. E. STOCKDER, Jr.